United States Patent
Jordan et al.

(10) Patent No.: US 8,611,869 B2
(45) Date of Patent: Dec. 17, 2013

(54) IDENTIFICATION OF AN ALTERNATE CONTACT FOR USE IN REACHING A MOBILE DEVICE USER

(75) Inventors: Kenneth D. Jordan, Groton, MA (US); Khaled Gouda, Shrewsbury, MA (US)

(73) Assignee: Cisco Technology, Inc., San Jose, CA (US)

(*) Notice: Subject to any disclaimer, the term of this patent is extended or adjusted under 35 U.S.C. 154(b) by 191 days.

(21) Appl. No.: 12/932,103

(22) Filed: Feb. 17, 2011

(65) Prior Publication Data
US 2012/0214449 A1   Aug. 23, 2012

(51) Int. Cl.
*H04M 3/42* (2006.01)

(52) U.S. Cl.
USPC ............... 455/414.1; 455/414.2; 455/413; 455/403; 455/456.1; 455/456.3

(58) Field of Classification Search
USPC ............... 455/414.1, 403, 456.1, 413, 456.3, 455/414.2
See application file for complete search history.

(56) References Cited

U.S. PATENT DOCUMENTS

| | | | |
|---|---|---|---|
| 7,006,833 B1* | 2/2006 | Contractor | 455/456.1 |
| 8,335,494 B2* | 12/2012 | Wilkerson | 455/414.1 |
| 2004/0171367 A1* | 9/2004 | Seligmann | 455/403 |
| 2008/0065450 A1 | 3/2008 | Jordan et al. | |

FOREIGN PATENT DOCUMENTS

WO   WO 2006/135553 A2   12/2006

OTHER PUBLICATIONS http://www.jaxtr.com/user/index.jsp.

* cited by examiner

*Primary Examiner* — David Q Nguyen
(74) *Attorney, Agent, or Firm* — Cindy Kaplan

(57) ABSTRACT

In one embodiment, a method includes detecting an unanswered communication received at a mobile device, identifying an alternate contact based on a location of the mobile device and a relationship between the mobile device user and the alternate contact, and transmitting a request to the alternate contact to notify the user of the mobile device of the communication. An apparatus and logic are also disclosed.

20 Claims, 3 Drawing Sheets

IDENTIFICATION OF AN ALTERNATE CONTACT FOR USE IN REACHING A MOBILE DEVICE USER

TECHNICAL FIELD

The present disclosure relates generally to mobile devices, and more particularly, to contacting a user of the mobile device.

BACKGROUND

With the increasing popularity of mobile devices, it has become easier to reach a contact, regardless of their location. However, there are often situations in which a person attempts to reach a contact via their mobile device and the contact does not answer because their mobile device is in a silent mode or in a location (e.g., briefcase, purse) which makes the ringer inaudible or other notification signal undetectable. This can be frustrating since the contact may be available, however, he does not know someone is trying to reach him. This may even result in serious consequences if it is an emergency situation.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, a method generally comprises detecting an unanswered communication received at a mobile device, identifying an alternate contact based on a location of the mobile device and a relationship between the mobile device user and the alternate contact, and transmitting a request to the alternate contact to notify the user of the mobile device of the communication.

In another embodiment, an apparatus generally comprises a processor for detecting an unanswered communication received at a mobile device, identifying an alternate contact based on a location of the mobile device and a relationship between the mobile device user and the alternate contact, and transmitting a request to the alternate contact to notify the user of the mobile device of the communication. The apparatus further includes memory for storing a list of contacts.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other embodiments and applications without departing from the scope of the embodiments. Thus, the embodiments are not to be limited to those shown, but are to be accorded the widest scope consistent with the principles and features described herein. For purpose of clarity, features relating to technical material that is known in the technical fields related to the embodiments have not been described in detail.

A mobile device provides a useful means of contacting a user regardless of the mobile device user's location. There may be times when the user is available to communicate, however, the user may not be aware of an incoming communication (e.g., call, text, e-mail, instant message). For example, the user may have set the mobile device to a silent mode or the mobile device may be in a location in which the user does not detect an alert for the incoming communication (e.g., hear a ring tone, feel a vibration, or see a flashing light). The mobile device user that a person is attempting contact may be with or near an alternate contact that both the user and person know (e.g., mutual friend, relative, co-worker, etc.). The embodiments described herein may be used to identify and notify an alternate contact so that the alternate contact can inform the mobile device user that there is an incoming communication.

Figure 1:
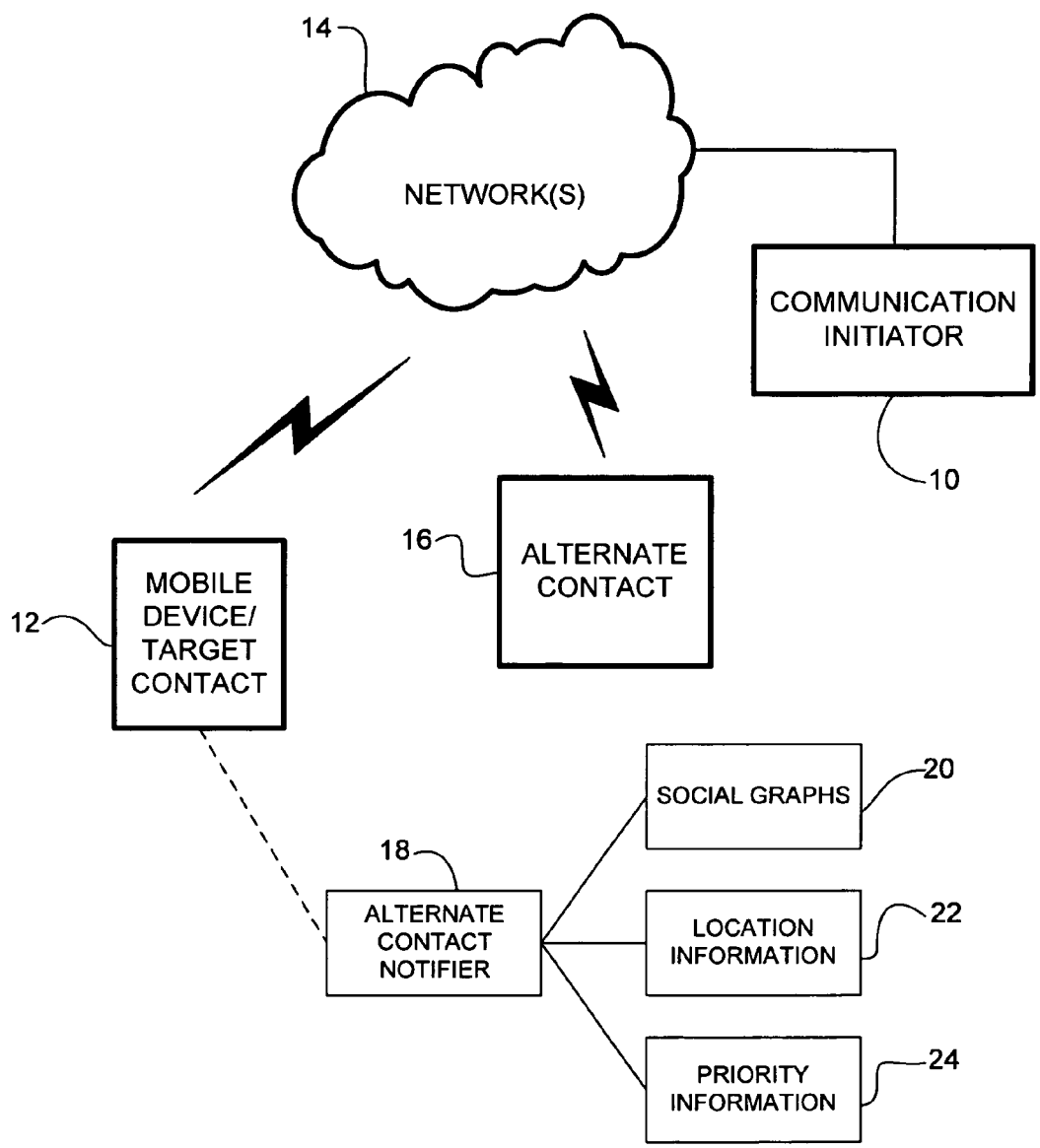
FIG. 1 illustrates an example of a network in which embodiments described herein may be implemented.

Referring now to the drawings, and first to FIG. 1, an example of a network which may be used to implement the embodiments described herein is shown. A communication initiator 10 is shown in communication with a mobile device 12 via one or more networks 14. The mobile device 12 is associated with a user (target contact) that the communication initiator 10 is attempting to contact. The communication initiator 10 refers to the person or device (e.g., mobile device, landline phone, personal computer, etc.) used by the person attempting to contact the user of the mobile device 12. The communication initiator 10 may be in wired or wireless communication with the network 14. The network 14 may include, for example, a local area network (LAN), wireless LAN (WLAN), wide area network (WAN), cellular network, Internet, intranet, satellite network, mobile data network, public switched telephone network (PSTN), and the like, or any combination thereof. The mobile device 12 may communicate with the network 14 via a wireless connection or may also be in wired communication with one or more networks (e.g., mobile device in docking station). The mobile device 12 may be any suitable equipment that supports communication, including for example, a mobile phone, personal digital assistant, wireless enabled portable computing device, multimedia device, and the like. Details of one example of the mobile device 12 are described below with respect to FIG. 2.

An alternate contact 16 is also in communication with one or more of the networks 14 via wireless or wired communication. The alternate contact 16 refers to a person (person identifier) or communication device (e.g., mobile device, landline phone, personal computer, etc.) used by the person and configured to receive a notification that someone is attempting to contact the mobile device user. The alternate contact 16 preferably has a relationship with both the communication initiator 10 and the mobile device user and is in physical proximity to the mobile device 12. The relationship may be, for example, between relatives, friends, co-workers, or other persons linked together via a social network, social graph, or other database. As described below, people identified as alternate contacts may have more than one device and address or number associated with them (e.g., mobile device (cell or text number, instant message address, e-mail address), landline phone (home or work number), laptop (e-mail address, instant message address), etc.). One device (e.g., mobile device) may be used to obtain location information for the alternate contact 16, while another device (e.g., landline phone) may be used to receive a message for use in contacting the mobile device user. For simplification, only one alternate contact 16 is shown, however, there may be any number of alternate contacts available for notifying the mobile device user of an incoming communication. Also, the network may include any number of communication initiators 10 and target contacts 12.

As described in detail below, an alternate contact notifier 18 is used to notify one or more alternate contacts 16 that someone is attempting to contact the mobile device user 12 when an unanswered communication is detected at the mobile device. The term 'unanswered' as used herein may refer to a call that is not answered, a text, e-mail, or instant message that is not opened or read, or any other type of communication in which there is an indication that the user of the mobile device is not aware of receiving the communication. The alternate contact notifier 18 has access to data including social graphs 20, location information 22, and priority information 24. The alternate contact notifier 18 and one or more of the social graphs 20, location information 22, and priority information 24 may be located at the mobile device 12 or another network device (e.g., server) in communication with the mobile device. For example, the alternate contact notifier 18 may reside in the network 14 (e.g., as a carrier provided service). The alternate contact notifier 18 may be located remote from one or more of the social graphs 20, location information 22, and priority information 24, or the alternate contact notifier and one or more of the social graphs, location information, and priority information may be located at the same device.

Figure 2:
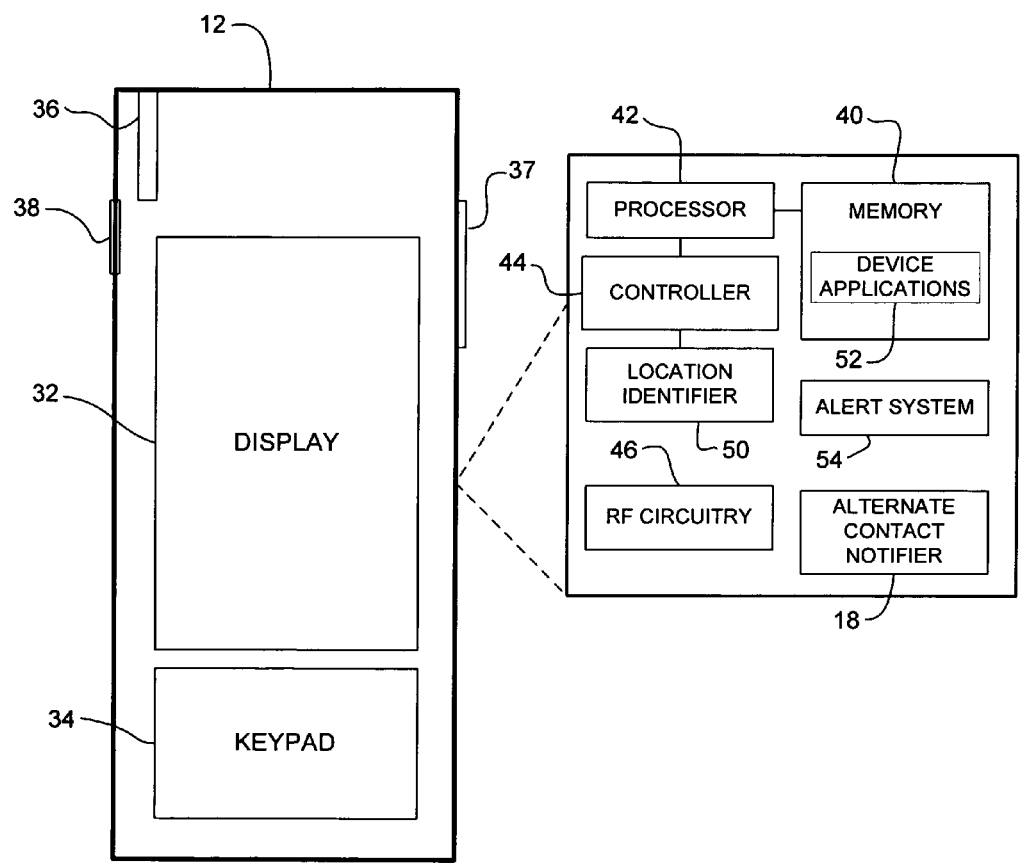
FIG. 2 is a block diagram illustrating an example of a mobile device useful in implementing embodiments described herein.

FIG. 2 illustrates an example of the mobile device 12 in which embodiments described herein may be implemented. The mobile device 12 includes a visual display 32 and a keypad 34 comprising multiple keys (not shown) used in operation of the device. The keypad 34 may also be a touch screen, which may be integrated with the display 32. The keypad 34 may include numeric keys, alphabetic keys, standard telephone keys, or any other icons or symbols. The mobile device 12 may include any number of other user interfaces such as one or more manual buttons (e.g., switch 37), a trackball, or other user interface. The mobile device 12 also includes an antenna 36, which may be internal or external to the device, for wireless communications. One or more external ports 38 may be provided for connection with another input or output device. The mobile device 12 may also include one or more speakers or microphones (not shown) and have tactile feedback (e.g., vibration).

As illustrated in the block diagram of FIG. 2, the mobile device 12 further includes memory 40, one or more processors 42, controller 44, RF (Radio Frequency) circuitry 46, location identifier 50, alert system (e.g., ringer, light) 54, and the alternate contact notifier 18.

Memory 40, which may include one or more computer readable storage mediums, may be any form of volatile or nonvolatile memory, including for example random access memory (RAM), read-only memory (ROM), magnetic media, optical media, flash memory, removable media, or any other suitable memory component. Memory 40 may store any data or information, including software and encoded logic, utilized by the mobile device 12. Memory 12 also includes software components such as device applications 52 and an operating system. Memory may also store data such as social graphs 20, location information 22, priority information 24, or list of alternate contacts 16 (FIGS. 1 and 2).

The one or more processors 42 run or execute various code, software programs, or instructions stored in memory 40 to perform various functions for the mobile device 12 and to process data. Logic may be encoded on one or more tangible computer readable media for execution by the processor 42. For example, memory 40 can be utilized to store and retrieve software programs incorporating computer code that implements aspects of the embodiments, data for use with the embodiments, and the like. The mobile device 12 includes any suitable combination of hardware, software, or encoded logic operable to send, receive, and process data or signals.

The RF circuitry 46 receives and transmits RF signals and converts electrical signals to/from electromagnetic signals and communicates with communication devices via the electromagnetic signals. Communication circuitry allows the mobile device to communicate with other network devices using any suitable communications protocol.

The controller 44 provides for management and control of various elements within the mobile device 12. For example, the controller 44 may access information maintained within memory 40 and control other elements to interact with users and other communication devices.

In one embodiment, the alternate contact notifier 18 is an application installed on the mobile device 12 and configured to receive input from one or more of the interfaces on the device to identify preferences chosen by the user. As described below, the user may input preferences related to the social graphs 20, location information 22, or priority information 24.

It is to be understood that the mobile device 12 shown in FIG. 2 and described herein is only one example, and that the device may have additional, fewer, or different components, or a different arrangement or configuration of components, without departing from the scope of the embodiments. Also, as previously noted, the alternate contact notifier 18 may be located at another network device comprising memory and a processor as described above.

Referring again to FIG. 1, the social graphs 20 are used to identify relationships and degrees of separation between individuals. Social networking sites (e.g., Facebook, LinkedIn) allow a user to identify relationships between the user and other contacts (e.g., parent, child, spouse, significant other, relative, friend, co-worker, etc.). The user may limit the people that can be identified as an alternate contact 16. For example, the user may tag people within their social network that the alternate contact notifier 18 may contact.

The location information 22 may be obtained via various techniques, including for example, Wi-Fi technology, Global Positioning System (GPS), Bluetooth, UWB (Ultra-Wideband), RFID (Radio Frequency Identification), or any other location tracking technology or combination of technologies. The location information 22 is used to generate a list of people that are in physical proximity to the target contact 12. For example, the location information may be used to identify two mobile devices (12 and 16) that are within a specified distance from one another. The location information 22 may also be used to identify a location of the mobile device 12 and a location of one or more alternate contacts 16 and then determine which of these alternate contacts are in the same general location as the mobile device 12. The user may specify a proximity range for which people may be identified as an alternate contact 16. For example, the user may enter a preference that people within a specified range or located in the same building may be used as an alternate contact.

Priority information 24 may be used to identify an incoming communication as meeting a specified threshold at which the alternate contact notifier 18 is to attempt to send a message to the alternate contact 16. It is to be understood that the term 'priority communication' as used herein refers to any communication that has been identified as meeting a minimum requirement for initiating the alternate contact notifier 18 to transmit a message to the alternate contact 16. Priority may be based on any number of factors. For example, the priority may be based on the communication initiator (e.g., spouse, child, co-worker), number of calls received from an individual within a specified period of time, time of day communication received (e.g., child at school), or message content (e.g., amber alert, school closing, etc.) (based on text processing (e.g., string matching), voice analysis, etc.). The user may configure preferences, for example, to specify that anytime a selected person (e.g., child, boss) attempts to communicate with the user and the communication goes unanswered, the communication is to be identified as a priority communication. In another example, the user may specify that any communication from the same source transmitted three times within five minutes is a priority communication. The user may also specify the type of communications that can be a priority communication (e.g., phone calls, phone calls and texts, etc.) or a combination of type of communication and source of communication that defines a priority communication (e.g., phone call from wife, text from son, etc.).

The mobile device 12 may also be configured to escalate a level for the alert system 54 on the mobile device based on the priority of the communication. For example, if a communication is received from a specified person or repeated communications are received from the same person, the alert (e.g., profile setting) for this communication transitions from silent to vibrate, then to ring level one, then to ring level two, etc. If the communication is still unanswered, then the alternate contact notifier 18 may proceed to transmit a message to the alternate contact 16. It is to be understood that this is only an example, and the alternate contact notifier 18 may identify an alternate contact and send a message to the alternate contact 16 when a priority communication is received and not answered, rather than first attempting to change the profile setting on the mobile device.

The user may also set a preference for a time period (or a default value may be used) between identifying an unanswered priority communication and notifying the alternate contact 16. The user may, for example, hear an incoming call but not answer the phone in time. This would allow the user time to call back the communication initiator 10 and prevent the alternate contact notifier 18 from sending a message to the alternate contact 16.

The alternate contact notifier 18 uses the social graph 20 and location information 22 to identify one or more alternate contacts 16 and send a message to the alternate contact 16 requesting the alternate contact to notify the target contact 12 of the incoming communication, as described below with respect to FIG. 3.

Figure 3:
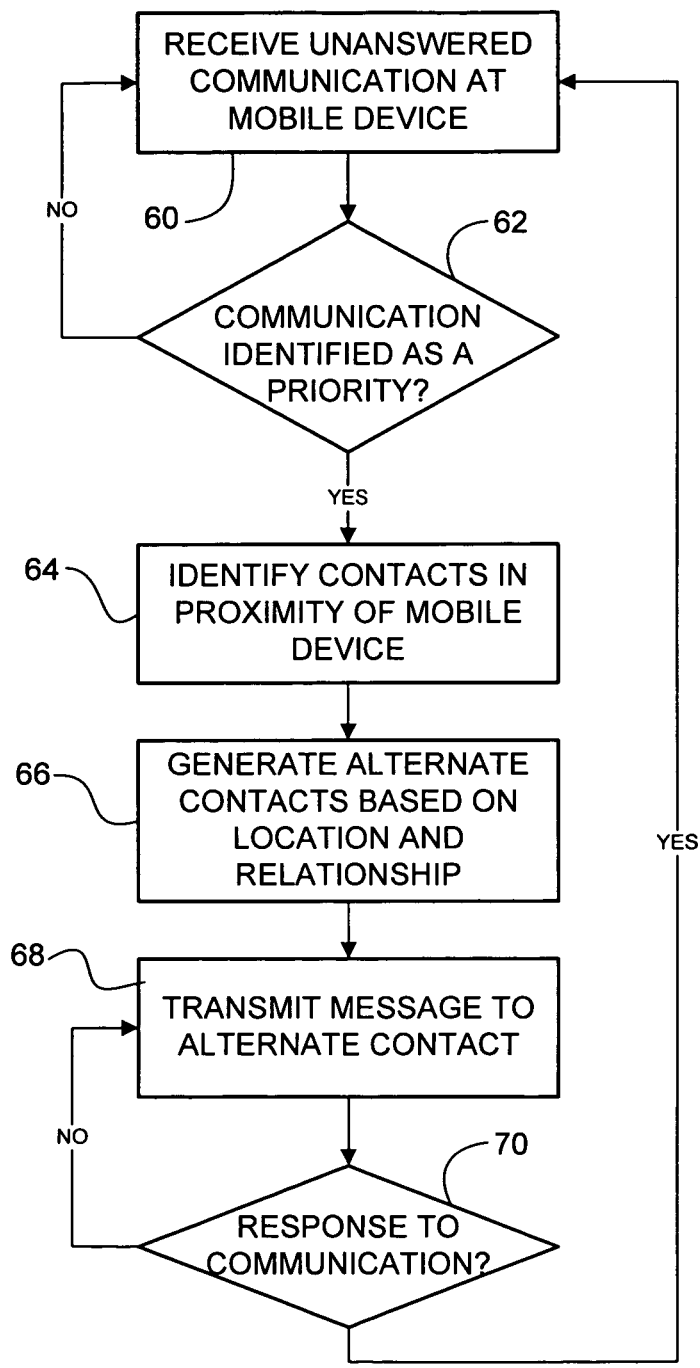
FIG. 3 is a flowchart illustrating an overview of a process for identifying an alternate contact for use in reaching a mobile device user, in accordance with one embodiment.

FIG. 3 is a flowchart illustrating an overview of a process for identifying an alternate contact for use in reaching a mobile device user, in accordance with one embodiment. At step 60 a communication is received at the mobile device 12 (FIGS. 1 and 3). The communication is unanswered (e.g., call not answered, text, e-mail, or instant message not opened or read). If the communication is identified as a priority communication (step 62), the process proceeds to step 64. The location information 22 is used to identify one or more contacts in the proximity of the mobile device 12 (step 64). One or more alternate contacts 16 are identified based on the location of the mobile device 12 and relationships between the mobile device user and the alternate contacts 16 (step 66). The relationship between the mobile device user and the alternate contacts may be identified, for example, in a social graph or other database containing a list of names of persons known by the mobile device user and degrees of separation between the user and contacts. The alternate contact 16 may also have a relationship with the communication initiator 10.

The alternate contact notifier 18 transmits a message to a first alternate contact (step 68). The message may be a prerecorded voice message, text message, e-mail, or any other type of communication. The content of the message may vary from simple (e.g., "Please tell X to check their mobile device") or detailed ("Please tell X to contact Y at phone number/address"). The alternate contact notifier 18 may end the process when a communication from the communication initiator 10 is received and answered by the mobile device user or the user contacts the communication initiator 10 (step 70). The target contact 12 may also manually end the process (e.g., select option using mobile device interface) if the user responds to the communication initiator 10 using another means of communication or does not want to respond. If the user of the mobile device 12 does not respond to the communication initiator 10 or end the process within a specified period of time, the alternate contact notifier 18 may transmit a message to the second alternate contact on the contact list (step 70).

It is to be understood that the process described above and shown in FIG. 3 is only one example and that steps may be removed, added, combined, or reordered, without departing from the scope of the embodiments.

The following describes an example of the process illustrated in FIG. 3. A call from a user's spouse (communication initiator) is received at a user's mobile phone and identified as a priority communication. The user does not hear the ringer and does not answer the call. The alternate contact notifier 18 generates a list of people in proximity to the user. The alternate contact notifier 18 then determines which of these individuals is mutually known to both the spouse and the user based on one or more social graphs. In this example, one of the people in proximity to the user is the user and spouse's daughter and another is a friend of the user and spouse. The list is sorted based on the social graph degrees of separation (i.e., the closest mutually known individual is at the top of the list). The alternate contact notifier 18 then transmits a message to the person at the top of the list (e.g., daughter). The message may be, for example, a text message to the daughter to tell her mother to check her phone or it may be more detailed and specify that her father is trying to contact her mother. If the spouse calls the user again and there is still no answer, the alternate contact notifier 18 can send a message to the mutual friend that is next on the alternate contact list. The call would have a status of answered once an incoming call from the spouse is answered on the user's phone, the user contacts the spouse using the mobile device, or the user manually ends the process at the alternate contact notifier application.

In one embodiment, the alternate contact notifier 18 also identifies the most reliable contact information for the alternate contact 16. For example, a first list of alternate contacts 16 generated by the alternate contact notifier 18 may be ordered based on their degrees of separation in the social graph (along with other user specified preferences). Each alternate contact may have one or more contact entries in their profile (e.g., cell phone number, home phone number, work phone number, instant message/text address, e-mail address, etc.) and location information (e.g., home address, work address). The contact entries may be joined across the set of alternate contacts to produce a second list. This second list may then be ordered based on location information so that the most reliable contact number or address is at the top of the list. For example, a landline phone may be considered more reliable than a mobile phone. If a person is identified as an alternate contact and the target contact is determined to be at the alternate contact's house based on location information, then the alternate contact's home phone number may be selected as the most reliable choice.

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A method comprising:
   detecting an unanswered communication received at a mobile device;
   identifying said unanswered communication as a priority communication;
   identifying using a processor, an alternate contact based on a location of the mobile device and a relationship between a user of the mobile device and the alternate contact;
   identifying a preferred number or address for the alternate contact; and
   transmitting a request to the alternate contact to notify the user of the mobile device of the communication, wherein transmitting a request to the alternate contact comprises transmitting a message to the preferred number or address for the alternate contact.

2. The method of claim 1 further comprising changing an alert setting at the mobile device before transmitting said request.

3. The method of claim 1 wherein said communication is identified as a priority communication based on a person transmitting said communication or content of said communication.

4. The method of claim 1 wherein said communication is identified as a priority communication based on a number of communications received from a source in a specified period of time, or a time of day said communication is received.

5. The method of claim 1 wherein said location comprises a proximity of the mobile device to the alternate contact.

6. The method of claim 1 wherein said relationship comprises a relationship identified in a social graph.

7. The method of claim 1 wherein said preferred number or address is identified based on the location of the mobile device.

8. The method of claim 1 wherein said unanswered communication is identified as a priority communication based on user preferences.

9. The method of claim 1 wherein the alternate contact is associated with at least two devices, one of the devices used to obtain location information for the alternate contact and the other of the devices used to receive the message.

10. The method of claim 1 wherein identifying a preferred number of address comprising selecting the preferred number of address based on a location of a mobile device associated with the alternate contact.

11. An apparatus comprising:
    a processor for detecting an unanswered communication received at a mobile device, identifying said unanswered communication as a priority communication, identifying an alternate contact based on a location of the mobile device and a relationship between a user of the mobile device and the alternate contact, identifying a preferred number or address for the alternate contact, and transmitting a request to the alternate contact to notify the user of the mobile device of the communication; and
    memory for storing a list of contacts, the alternate contact included in said list of contacts;
    wherein transmitting a request to the alternate contact comprises transmitting a message to the preferred number of address for the alternate contact.

12. The apparatus of claim 11 wherein said communication is identified as a priority communication based on a person transmitting said communication or content of said communication.

13. The apparatus of claim 11 wherein said communication is identified as a priority communication based on a number of communications received from a source in a specified period of time, or a time of day said communication is received.

14. The apparatus of claim 11 wherein said preferred number or address is identified based on the location of the mobile device.

15. The apparatus of claim 11 wherein said list of contacts comprises contacts in proximity to the mobile device.

16. The apparatus of claim 11 wherein the alternate contact is selected from the list of contacts based on the relationship identified in a social graph.

17. The apparatus of claim 15 wherein said proximity corresponds to a user specified distance.

18. The apparatus of claim 11 wherein the memory is configured for storing at least two contact entries for the alternate contact and a second list comprising said contact entries for each of a plurality of alternate contacts ordered based on location information.

19. Logic encoded on one or more tangible computer readable media for execution and when executed operable to:
    detect an unanswered communication received at a mobile device;
    identify said unanswered communication as a priority communication;
    identify an alternate contact based on a location of the mobile device and a relationship between a user of the mobile device and the alternate contact;
    identify a preferred number or address for the alternate contact; and
    transmit a request to the alternate contact to notify the user of the mobile device of the communication;
    wherein the logic is operable to identify said unanswered communication as a priority communication and generate a request for the alternate contact directed to the preferred number or address for the alternate contact.

20. The logic of claim 19 wherein said preferred number or address for the alternate contact is selected based on reliability of the number of address.

* * * * *